Dec. 29, 1931.   H. H. POTTER   1,839,119
APPARATUS FOR CLEANSING UNITS OF AUTOMOTIVE VEHICLES
Filed March 1, 1929   2 Sheets-Sheet 1
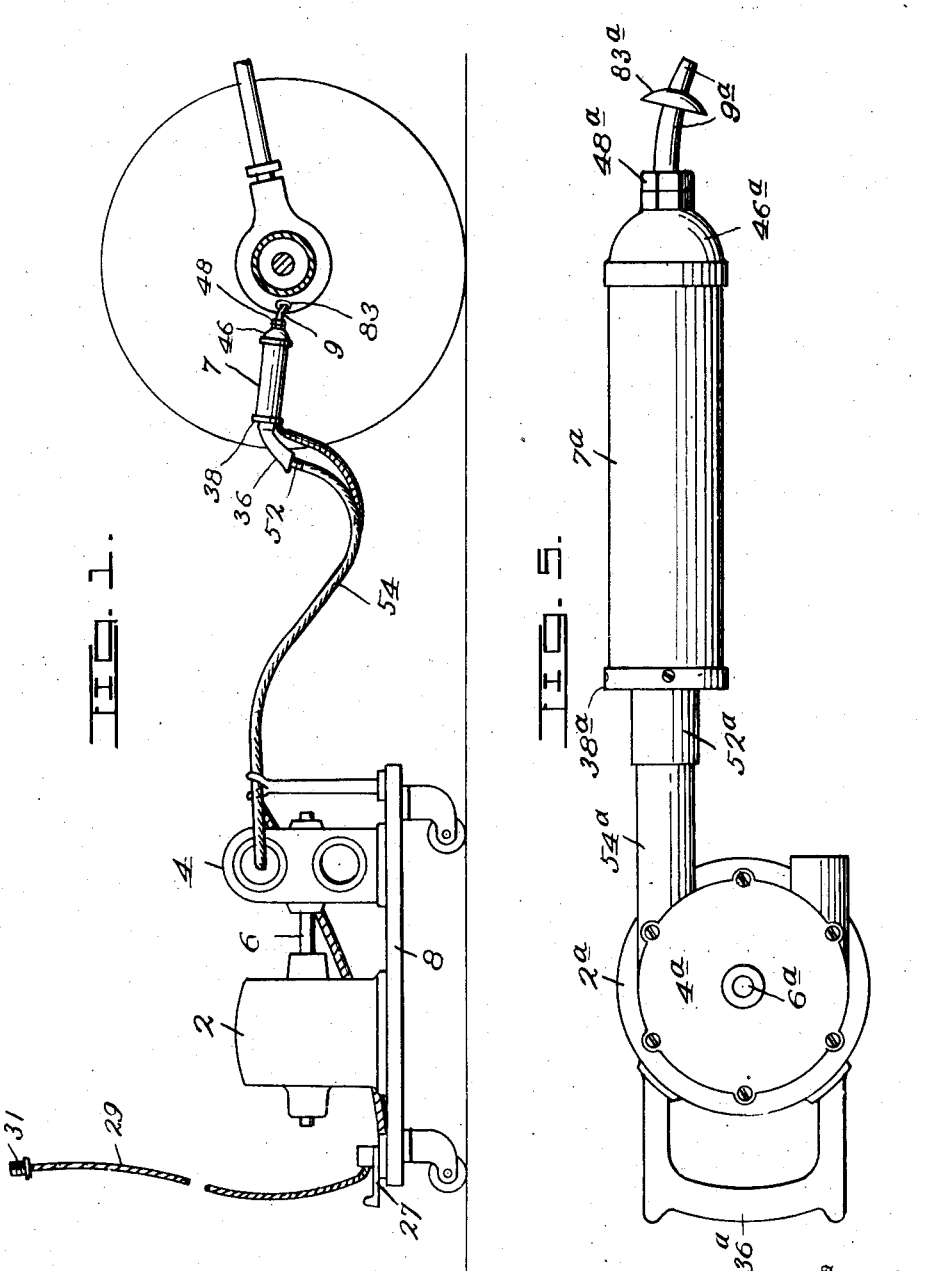
Inventor:
Harold H. Potter,
Witness:
Fred C. Fischer.
By
F. G. Fischer,
Attorney.

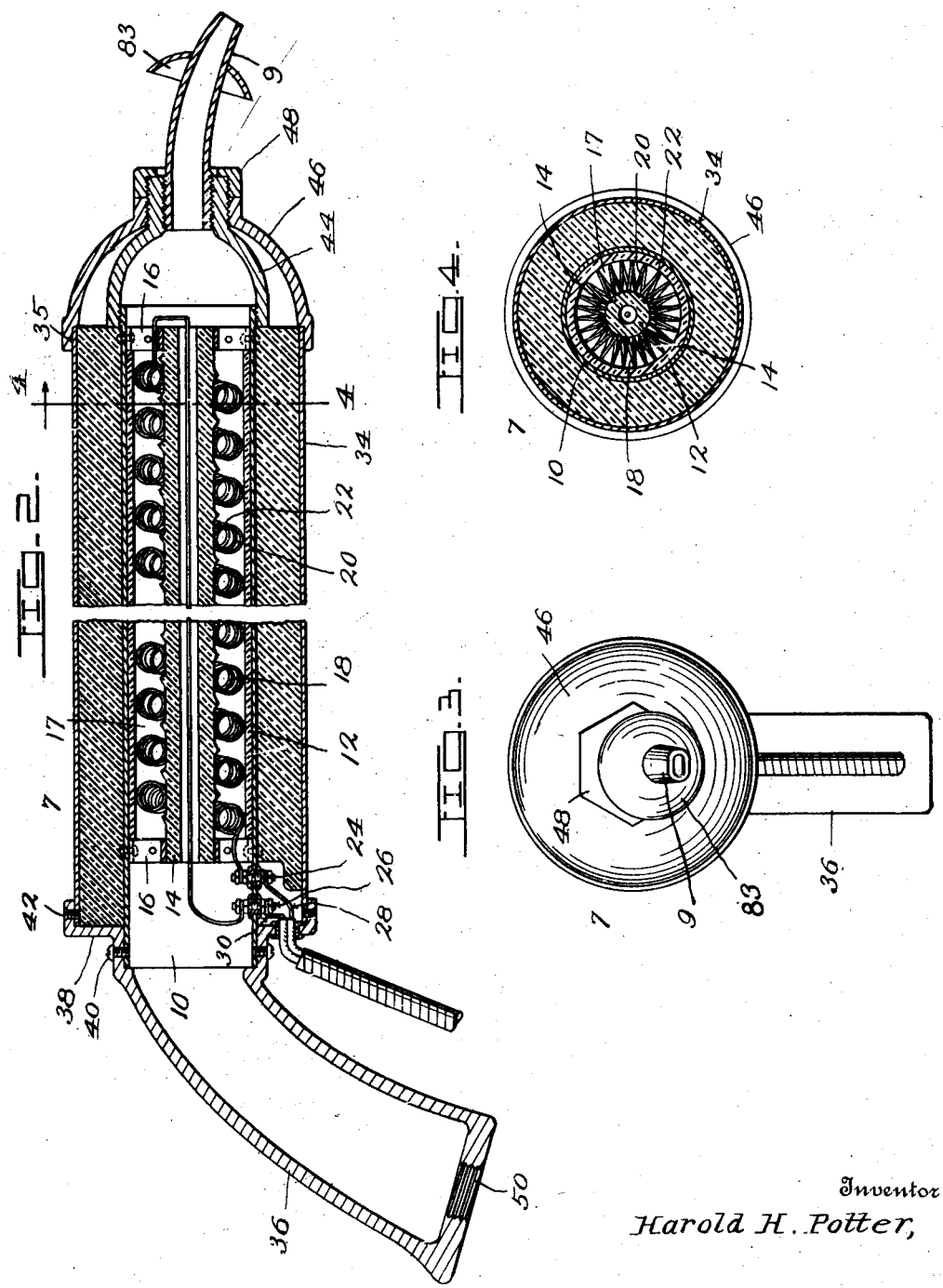

Patented Dec. 29, 1931

1,839,119

UNITED STATES PATENT OFFICE

HAROLD H. POTTER, OF KANSAS CITY, MISSOURI

APPARATUS FOR CLEANSING UNITS OF AUTOMOTIVE VEHICLES

Application filed March 1, 1929. Serial No. 343,737.

My invention relates to a method of and apparatus for cleansing the gear casings, universal joints and other lubricating units of automotive vehicles and may be employed to advantage at garages, filling stations and other service stations. In cold weather the grease in the casings congeals and becomes hardened to such an extent that it cannot be drained off preparatory to recharging with fresh grease and as a result the casings must be disassembled to a greater or less extent before they can be properly cleansed.

One object of the present invention is to provide a simple and efficient apparatus by means of which the casings can be quickly and easily cleaned of the old grease without disassembling said casings.

A further object is to provide a portable apparatus for quickly reducing the old hardened grease to a liquid or semiliquid state and forcing it from the casings by introducing into the latter a blast of air heated to a high temperature. In practice I have found that air under pressure of eight pounds per square inch and heated to a temperature of six hundred and twenty degrees F. is very efficient in cleansing the casings, although it is to be understood that good results may be had with other pressures and temperatures.

In order that the invention may be fully understood, reference will now be had to the accompanying drawings, in which:

Fig. 1 is a diagrammatic view of the apparatus applied to the differential gear case of a motor vehicle.

Fig. 2 is a broken longitudinal section of a nozzle forming an important part of the invention.

Fig. 3 is a front elevation of the nozzle.

Fig. 4 is a cross section of the nozzle on line 4—4 of Fig. 2.

Fig. 5 is a modification of the invention.

Referring in detail to the different parts, 2 designates a suitable motor which is preferably of the electrical type, and 4 designates a blower which is preferably connected direct to the motor shaft 6. For convenience in moving the apparatus around the motor 2 and the blower 4 are preferably mounted upon a truck 8 as shown by Fig. 1.

The nozzle 7 disclosed more clearly by Fig. 2 may be made in various forms, but embodies a passageway, hereinafter referred to, through which an air blast from the blower 4 is forced, and means for heating the air blast during its flow through said passageway. The nozzle 7 is provided at its forward end with a jet 9 which may be exchanged for other jets for connection with or insertion into the various lubricant units of an automotive vehicle.

In constructing the nozzle 7 an inner tube 10 is employed which preferably consists of metal lined with insulating material 12 for preventing said tube from becoming charged with current from an electrical heating element hereinafter described. Arranged axially within the inner tube 10 is a hollow core 14 of suitable insulating material supported at its ends by brackets 16 which are riveted or otherwise secured to said inner tube 10. The hollow core 14 is of less diameter than the lining 12 to leave an intervening annular passageway 17 for the flow of the air blast from the blower 4 through the nozzle 7. The annular passageway 17 is preferably of uniform diameter and open at both ends so as not to retard the flow of air therethrough.

An electrical heating unit 18 is wound around the core 14 and in the present instance consists of a resistance wire wound in small transverse convolutions 20 and relatively large convolutions 22, which latter extend around the core 14. By thus forming the heating unit 18 into minor and major convolutions a large heating surface is provided which raises the temperature of the air blast in its flow through the passageway 17 to a high degree and by leaving spaces between said convolutions for the passage of the air blast the flow of the latter will not be materially retarded. One end of the heating unit 18 is connected to a binding post 24 while its opposite end extends through the hollow core 14 and is attached to a binding post 26 secured beside the binding post 24 to the rear portion of the inner tube 10. Circuit wires 28 and 30 lead from the binding posts 24 and 26, respectively, to a suitable switch 27 provided with an extension cord 29 having a plug 31 which may be connected to an electric light socket or other suitable outlet.

The periphery of the inner tube 10 is covered with a jacket of insulating material 32 to prevent loss of heat by radiation, and said insulating material is enclosed in an outer tube 34 consisting preferably of polished metal for adding to the appearance and stability of the nozzle.

For convenience in handling the nozzle 7, I equip the rear end thereof with a pistol grip 36 provided at its upper end with a circular flange 38, which is removably secured to the rear ends of the inner and outer tubes 10 and 34 by suitable means such as screws 40 and 42, respectively.

The forward end of the inner tube 10 is threaded into the rear end of a coupling member 44, into the front end of which latter the jet 9 is removably threaded. The forward end of the outer tube 34 has a slip joint connection 35 with the rear end of a member 46 threaded at its forward end upon the forward end of the coupling member 44, which latter is provided with a lock nut 48 for preventing accidental rotation of the member 46 when in place. The slip joint 35 permits the inner tube 10, which is subjected to a higher temperature than the outer tube 34 to expand and contract to a greater degree than said outer tube.

Referring again to the pistol grip 36 it will be noted that it has a threaded opening 50 in its lower end for the reception of a coupling 52 on the forward end of a hose 54 which is connected at its rear end to the outlet end of the blower 4.

With the parts arranged as shown and described it is apparent that when an electrical current passes through the heating element 18 the latter will attain a red heat and thereby raise the temperature of the air blast from the blower 4 to a high degree, so that when discharged under pressure and at a high temperature into a gear case or other lubricant unit of a motor vehicle the grease therein will be quickly reduced to a liquid state and forced from said gear case or other lubricant unit. It is also apparent that the apparatus may be employed to advantage for thawing out frozen radiators and carburetors, for drying wet ignition coils and other electrical units. In order to prevent the grease from spattering over the operator by being blown from the hole of the lubricant unit in which the jet 9 is inserted, I provide said jet with a shield 83 for sealing up said hole.

In the modified form disclosed by Fig. 5 the nozzle is constructed like the one disclosed by Fig. 2 as is evidenced by corresponding reference characters with exponents $a$, but instead of mounting the motor $2a$ and the blower $4a$ upon a truck they are connected together and the exhaust port of the blower $4a$ is connected to a discharge pipe $54a$ communicating with the rear end of the nozzle $7a$. A handle $36a$ is secured to the motor $2a$ for convenience in manipulating the nozzle $7a$.

From the foregoing description taken in connection with the drawings, it is apparent that I have provided an apparatus possessing the advantages above pointed out, and while I have shown two forms of the invention I reserve all rights to such other forms as properly fall within the spirit and scope of the invention as claimed.

Having thus described my invention, what I claim and desire to secure by Letters Patent, is:

1. In an apparatus of the character described, a nozzle consisting of inner and outer tubes, said inner tube having an air inlet and an air outlet, a tubular handle communicating with the inlet of the inner tube and provided with a flange uniting one end of the inner and outer tubes, a tubular member secured to the other end of the inner tube and communicating with the outlet of the latter, a second tubular member connected to the first tubular member and the adjacent end of the outer tube, and an electric heating coil arranged within said inner tube.

2. In an apparatus of the character described, a nozzle consisting of inner and outer tubes insulated from each other, said inner tube having an air inlet and an air outlet, suitable means connecting said inner and outer tubes, an insulated core arranged axially within the inner tube, an electric heating coil extending around said core and consisting of minor and major convolutions spaced apart for the passage of air to be heated, means for introducing an air current into the inner tube, and a tip communicating with the air outlet of the inner tube and adapted to discharge the heated air into the lubricant casings of a motor vehicle.

In testimony whereof I affix my signature.

HAROLD H. POTTER.